(12) United States Patent
Wietelmann et al.

(10) Patent No.: US 7,666,310 B2
(45) Date of Patent: Feb. 23, 2010

(54) METHOD OF DRYING ORGANIC LIQUID ELECTROLYTES

(75) Inventors: Ulrich Wietelmann, Friedrichsdorf (DE); Klaus Schade, Wiesbaden (DE); Uwe Lischka, Niedereschbach (DE)

(73) Assignee: Chemetall GmbH, Frankfurt am Main (DE)

( * ) Notice: Subject to any disclaimer, the term of this patent is extended or adjusted under 35 U.S.C. 154(b) by 0 days.

(21) Appl. No.: 11/355,828

(22) Filed: Feb. 16, 2006

(65) Prior Publication Data

US 2006/0138056 A1 Jun. 29, 2006

Related U.S. Application Data

(63) Continuation of application No. 10/381,126, filed as application No. PCT/EP01/10924 on Sep. 21, 2001, now abandoned.

(30) Foreign Application Priority Data

Sep. 27, 2000 (DE) ................................ 100 49 097

(51) Int. Cl.
*B01D 37/00* (2006.01)
*B01D 17/02* (2006.01)
*B01D 17/038* (2006.01)

(52) U.S. Cl. ................ 210/716; 210/702; 210/668; 210/689; 429/189; 429/324

(58) Field of Classification Search ............... 210/689
See application file for complete search history.

(56) References Cited

U.S. PATENT DOCUMENTS

| 2,562,972 | A | * | 8/1951 | Wald ........................... 141/11 |
| 3,864,168 | A | * | 2/1975 | Casey et al. .................. 429/337 |
| 5,496,661 | A | * | 3/1996 | Mao ........................... 429/331 |
| 6,195,251 | B1 | * | 2/2001 | Suhara et al. ................ 361/502 |
| 6,251,349 | B1 | * | 6/2001 | Zaluska et al. ............... 423/286 |
| 6,551,748 | B1 | * | 4/2003 | Atwater et al. .............. 429/341 |
| 6,573,002 | B1 | * | 6/2003 | Jungnitz et al. ............. 429/189 |

FOREIGN PATENT DOCUMENTS

| DE | 198 27 631 A1 | 12/1999 |
| JP | 59009874 A | 1/1984 |
| JP | 59046764 A | 3/1984 |
| JP | 11054378 A | 2/1999 |
| WO | WO 99/67843 | 12/1999 |
| WO | WO 99/67844 | 12/1999 |
| WO | WO-9967843 | * 12/1999 |

OTHER PUBLICATIONS

Patent Abstract of Japan Application No. 62280033; Publication No. 01122566 dated May 15, 1989, "Purification of Nonaqueous Electrolyte", Mitsubishi Petrochem Co Ltd.

* cited by examiner

*Primary Examiner*—Peter A Hruskoci
(74) *Attorney, Agent, or Firm*—Fubright & Jaworski L.L.P.

(57) ABSTRACT

A method is described for removing water and other protic impurities from an organic liquid electrolyte, wherein the organic liquid electrolyte is brought into contact with one or more insoluble alkali metal hydride(s) and the insoluble reaction by-products formed thereby are separated off.

25 Claims, No Drawings

METHOD OF DRYING ORGANIC LIQUID ELECTROLYTES

This application is a continuation application of U.S. Ser. No. 10/381,126 filed Jun. 13, 2003, now abandoned which is a §371 of PCT/EP01/10924 filed Sep. 21, 2001, which claims priority from German Patent Application No: 100 49 097.2 filed Sep. 27, 2000.

The present invention relates to a method of removing water and other protic impurities from organic liquid electrolytes.

The lithium batteries (both primary and secondary battery cells) commonly used today normally contain anhydrous, liquid, ionically conducting electrolytes in which conducting salts, such as, for example, $LiPF_6$, $LiBF_4$, $LiClO_4$, lithium imides, lithium methides or lithium chelato complexes such as, for example, lithium bis(oxalato)borate, are present in dissolved form. Many of those conducting salts decompose more or less rapidly in the presence of protic compounds, such as, for example, water, for example according to

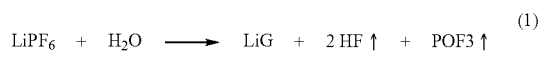

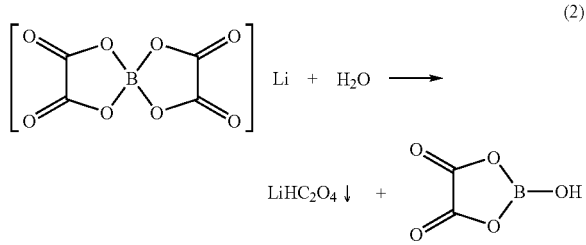

The gaseous products (HF, $POF_3$, etc.) formed during the hydrolysis of fluorine-containing conducting salts are highly corrosive and damaging to the other components of the battery, such as, for example, the cathode materials. For example, HF leads to the dissolution of manganese spinels and damages the cover layer on the electrode materials that is important for a long service life. As a result, the cycle stability of secondary batteries is impaired. Borate electrolytes are also sensitive to water. In this case, in part insoluble hydrolysis products form and impair the functional properties. Although there are conducting salts that are inert towards water, such as, for example, $LiClO_4$, negative effects are to be expected in the presence of water in this case too, these negative effects being mainly attributable to a disturbance in the cover layer formation and the build up of pressure owing to reaction with the anode according to

It is therefore necessary to reduce the content of protic impurities to a minimum ($H_2O$<20 ppm, HF<approx. 30 ppm). A number of methods have been developed therefor, but they are all associated with disadvantages.

In JP 208 7473 it is proposed to mix electrolyte solutions with a solvent that forms low-boiling azeotropic mixtures with water, and to remove the water/solvent azeotropic mixture by distillation. The disadvantages of this method are the undesired impurities with the entraining solvent and the restriction to high-boiling electrolyte solvents.

In U.S. Pat. No. 5,395,486 and in WO 2000038813, inert fluorinated liquids such as, for example, $C_8F_{18}$ are used as entrainers. A disadvantage of those methods is, inter alia, the emissions of fluorine-containing substances associated therewith.

The method proposed in JP 103 38653 of effecting the drying of electrolyte solutions by blowing through dry inert gases has the disadvantage that very expensive (subsequently purified) inert gas must be used and considerable losses of solvent occur, or the discharged solvent vapours must be condensed and fed back in a complex operation.

Another method described in DE 19827631 and described in a similar form in JP 2000058119 is based on the physical adsorption of water and HP on specially pre-treated aluminium oxide. A disadvantage of the adsorption method is the complex pre-treatment of the Al oxide (drying for 4 weeks in a stream of nitrogen at 400° C.).

DE 19827630 describes a method of cleaning battery electrolytes that consists in bringing a base, fixed to a solid, for the chemical adsorption of protic impurities into contact with the electrolyte solution and then separating off the solid cleaning agent. It is a disadvantage that the amine-containing cleaning agents fixed to a polymer are expensive and also require pre-treatment (e.g. drying in vacuo for 4 days at 100° C.).

Finally, methods of drying electrolyte solutions by means of alkali metals are known. For example, F. P. Dousek et al. (Chem. Listy (1973), 67 (4) 427-432) propose first pre-drying with molecular sieve and then carrying out final drying by means of liquid K/Na alloy. In a manner that is in principle similar, JP 01122566 describes cleaning electrolyte solutions by filtering them through a column packed with solid alkali metals. However, the use of alkali metals in contact with relatively reactive solvents is not without risk in terms of safety. Thus it is known that tetrahydrofuran, for example, is attacked by lithium metal above approximately 100° C. The other alkali metals may also react extraordinarily vigorously at moderately elevated temperatures with the solvents used in lithium battery electrolytes.

Modern supercapacitors may also contain an organic electrolyte which is generally the solution of an ammonium salt in an aprotic solvent having a high dielectric constant, such as, for example, acetonitrile or γ-butyrolactone. The ammonium salts generally have perfluorinated anions such as $PF_6^-$ or $BF_4^-$. These are electrochemically stable, not very nucleophilic and do not become incorporated into the active electrode masses.

This type of electrolyte must also have a low water content (<20 ppm). In order to achieve this, JP 11054378 and JP 11008163 propose adding to the electrolyte adsorbents based on inorganic oxides, for example aluminosilicates. Such adsorbents are able to lower the water content and hence improve the reliability, safety and current characteristics. The disadvantages of this method are on the one hand that the adsorbents must be pre-treated and on the other hand that adsorbent remains in the finished capacitor, so that the specific storage capacity is reduced.

The object of the present invention is to avoid the disadvantages of the prior art and to provide a method of removing water and other protic impurities from organic liquid electrolytes. Organic liquid electrolytes are to be understood as being solutions containing lithium salts and/or ammonium salts with electrochemically resistant anions in aprotic, polar, organic solvents.

This method
is to be generally applicable,
is not to lead to additional contamination,
is to use commercially available drying agents that do not require further conditioning,
is to be without risk in terms of safety and is to yield product solutions having water contents down to <20 ppm.

The object is achieved by a method of removing water and other protic impurities from an organic liquid electrolyte, wherein the organic liquid electrolyte is brought into contact with one or more insoluble alkali metal hydride(s) and the insoluble reaction by-products formed thereby are separated off. The removal of water and other protic impurities is to be understood as meaning the partial removal to the complete removal.

In particular the binary hydrides of lithium (LiH) and sodium (NaH) that are used as the preferred drying agents are relatively inexpensive in large amounts and are available in pure form. Although they are completely insoluble in the aprotic solvents used for lithium batteries, it has been found that LiH, NaH and the other alkali metal hydrides KH, RbH and CsH are rapidly effective insofar as the drying operation is concerned, and very low residual contents of protic impurities can be achieved. In addition, it has surprisingly been found that the drying agents in hydride form used according to the invention are substantially more advantageous in terms of safety than the alkali metals themselves. In DSC measurements (differential scanning calorimetry, carried out in a RADEX apparatus from Systag/Switzerland) on mixtures of LiH or Li metal repsectiley and lithium bis(oxalato) borate solutions as well as $LiClO_4$ and $LiPF_6$ solutions, it has been found that the beginning of the dangerous, highly exothermic decomposition reaction, expressed as the so-called ONSET temperature ($T_{ONSET}$), is significantly higher in the case of the hydrides (see Table 1).

TABLE 1

Thermal decomposition of electrolytes in contact with LiH and Li metal (Radex experiments)

| Electrolyte | Conducting salt concentration (wt. %) | Li metal | | LiH | |
|---|---|---|---|---|---|
| | | $T_{ONSET}$ | $T_{MAX}$ | $T_{ONSET}$ | $T_{MAX}$ |
| $LiPF_6$/EC-DMC | 11 | 145 | 160 | 230 | (240)[1)] |
| $LiClO_4$/PC-DME | 6 | 160 | 165 | 255 | 265 |
| LOB/EC-DMC | 10.5 | 180 | 220 | 240 | ./.[1)] |

EC = ethylene carbonate,
DMC = dimethyl carbonate,
PC = propylene carbonate,
DME = 1,2-dimethoxyethane,
LOB = lithium bis (oxalato) borate
[1)]$T_{MAX}$ cannot be determined or is difficult to determine because the sample vessels have opened
$T_{ONSET}$ = beginning of me first exothermic reaction (° C.)
$T_{MAX}$ = maximum of the exothermic reaction (° C.)

It will be seen from the comparative data that the hydrides ensure a high degree of operating safety, which is extremely important in the case of production on a relatively large scale.

The method according to the invention can be used with all organic liquid electrolytes, that is to say, for example, solutions of fluorides, such as $MPF_6$, $MAsF_6$, $MBF_4$
perchlorates $MClO_4$
lithium iodide LiI
triflates $MSO_3R_8$
imides $MN(SO_2R_F)_2$
methides $M[C(SO_2R_F)_3]$
chelatoborates $M[L_2B]$
chelatophosphates $M[L_3P]$ where M=Li or $NR_6$ (R=H or alkyl having from 1 to 10 carbon atoms, also cyclic)
$R_F$=perfluorinated alkyl radical having from 1 to 10 carbon atoms, also cyclic
L=bidentate ligand having two O atoms, such as, for example, oxalate, catecholate, salicylate, also partially or wholly fluorinated in aprotic solvents having a high-dielectric constant, such as
carbonates, e.g. dimethyl carbonate, diethyl carbonate, ethylene carbonate, propylene carbonate, ethylmethyl carbonate,
nitriles, e.g. acetonitrile, adipic acid dinitrile, glutaric acid dinitrile,
lactones, e.g. γ-butyrolactone,
amides, e.g. dimethylformamide, N-methylpyrrolidone,
ethers, e.g. tetrahydrofuran, 2-methyltetrahydrofuran, 1,2-dimethoxyethane (monoglyme), 1,3-dioxolan,
acetals, e.g. 1,1-diethoxymethane
carbonic acid esters, e.g. ethyl formate, propyl formate, diethyl oxalate
boric acid esters, e.g. tributyl borate, trimethyl borate
phosphoric acid esters, e.g. tributyl phosphate, trimethyl phosphate
sulfur compounds, e.g. dimethyl sulfoxide, sulfolane and mixtures thereof.

The alkali metal reacts energetically and irreversibly with proton-active substances according to:

$$MH + X-H \rightarrow MX\downarrow + H_2\uparrow \qquad (4)$$

X=HO, halogen, RCOO, RO and the like
R=alkyl

In order that the reaction (4) associated with the evolution of gas is not too vigorous, the hydride is preferably added in portions to the liquid electrolyte. In a further preferred embodiment of the invention, the content of proton-active substances, for example water, is not to exceed a particular upper limit of 0.6 mmol/g active H concentration, for example 1% water, Although liquid electrolytes containing larger amounts of impurities can also be dried while observing the safety precautions known to the person skilled in the art, it is recommended in such cases first to use a different drying method and to carry out only the final drying using the method according to the invention.

The drying method according to the invention can be carried out as described below by way of example.

An alkali metal hydride is added in portions, preferably with stirring, to the moist liquid electrolyte optionally contaminated with other proton-active substances. This operation is preferably carried out in a temperature range from −20 to 150° C., particularly preferably from 0 to 90° C. The drying operation can readily be monitored by measuring the volume of gas that develops. In some cases (mainly when significant amounts of acid are present, e.g. 0.1 mmol/g HCl), the evolution of gas is very vigorous and foaming occurs. Cooling is then necessary. Otherwise, the reaction is scarcely noticeably exothermic. Depending on the activity of the drying agent, a subsequent reaction phase at room temperature or elevated temperature (up to 90° C., sometimes up to 120° C.) is necessary to complete the drying.

The amount of drying agent to be used is determined on the one hand by the "activity" of the metal hydride used and on the other hand by the concentration of the proton-active impurity—generally water. The water content is normally determined by Karl Fischer titration. The amount of drying agent used is preferably such that it corresponds at least to the amount of water determined by Karl Fischer titration (or an alternative water determination). In order to shorten the reaction times, the drying agent can preferably be used in a stoichiometric excess (e.g. from 2 to 100 times). The excess to be used in a particular case is given by the activity of the hydride and the precise manner in which the drying operation is carried out. The drying ability is dependent on the "active surface area" of the metal hydride, i.e. the activity is better the finer the degree of distribution of the metal hydride. The drying ability of the metal hydride is additionally dependent on the nature of the pre-treatment.

The "fresher" a metal hydride, the more active it is in general. Metal hydrides that have been in contact with air or moisture are "passivated" and must generally be activated. This may be effected by milling under an inert gas atmosphere. This operation may take place separately from the point of view of space or in situ, i.e. during drying of the electrolyte.

It has been found that the commercially available hydride grades are sufficiently active to dry an electrolyte to water contents <20 ppm within a few hours. In order to assist the drying operation intensive stirring is preferably carried out, on a laboratory scale, for example, using a high-speed propeller stirrer. Drying may also be carried out by passing the liquid electrolyte over a fixed bed containing the metal hydride (e.g. a column).

When the drying operation is complete, residues of the drying agent and insoluble reaction products must be separated off. It has been found that the alkali metal hydroxide formed according to (4) is completely insoluble in the solvents and solvent mixtures mentioned above. Accordingly, the undesirable reaction by-products can be separated off by means of a simple solid/liquid separating operation such as filtration or centrifugation.

The clear solutions prepared in this manner have extremely low water contents (and equally low contents of other proton-active substances). They can be used without further treatment as electrolytes for electrolytic cells, preferably lithium batteries, or electrolytic two-layer capacitors (supercapacitors).

The subject of the invention is explained in greater detail below by means of examples:

EXAMPLES 1 TO 6

Drying of Various Electrolyte Solutions

Various electrolyte solutions indicated in Table 2 were dried under different drying conditions with the aid of the method according to the invention. The general experimental set-up was as follows:

The crude electrolyte solution in question was placed in a multi-necked flask which-had been rendered inert and was equipped with a KPG stirrer, a device for adding solids, and a thermocouple. A sample was removed by means of a plastics syringe and its water content was checked by Karl Fischer titration.

The amount of LiH specified in Table 2 was then added, and stirring was carried out under the conditions likewise indicated in Table 2. After the given drying times, samples were again removed and were clarified by filtration by means of syringe attachment filters (e.g. Minisart SRP, 0.45 μm pore size from Sartorius), and their water-content was checked again.

The dried solutions were then clarified by filtration over glass filter frits.

TABLE 2

| | | Drying conditions far various electrolytes | | | | |
|---|---|---|---|---|---|---|
| Ex. | Elecrolyte solution | $H_2O$ content (ppm) | Amount (g) | Amount of LiH (g) | Drying temperature (° C.) | Drying time (hrs) | $H_2O$ content (ppm) |
| 1 | $LiClO_4$/PC-DME | 870 | 150 | 0.8 | room temp- | 2.5 | 265 |
| 2 | " | " | " | " | " | 15 | 15 |
| 3 | $LiClO_4$/PC-DME | 340 | 8000 | 3.4 | 70 | 2 | 100 |
| 4 | " | 340 | 8000 | 4.7 | 70 | 5 | 10 |
| 5 | LOB/PC-DME | 340 | 1010 | 4.8 | 40 | 24 | 55 |
| 6 | LOB/EC-DMC | 120 | 2600 | 15.4 | 70 | 24 | <20 |

As will be seen from Table 2, the degree of drying depends on the conditions chosen in each case. In order to achieve residual water contents of <20 ppm, drying times of from 5 to 24 hours are necessary in the described Examples.

The invention claimed is:

1. A method comprising removing water and other protic impurities form an organic liquid electrolyte by contacting an organic liquid electrolyte comprising a solution of at least one lithium electrolyte and at least one aprotic, polar organic solvent with at least one insoluble alkali metal hydride for at least 5 hours to 24 hours and separating insoluble reaction byproducts therefrom to form a purified dried organic liquid electrolyte having a content of protic impurities less than 20 ppm.

2. A method according to claim 1, wherein said alkali metal hydride is LiH or NaH.

3. A method according to claim 2, wherein said alkali metal hydride is LiH.

4. A method according to claim 2, wherein the metal hydride is NaH.

5. A method according to claim 1, wherein the method is conducted at a temperature is from −20 to 150° C.

6. A method according to claim 5, wherein the temperature is from 0 to 90° C.

7. A method according to claim 1, wherein the amount of metal hydride corresponds at least to the stoichiometric amount of said protic impurities.

8. A method according to claim 1, wherein the amount of metal hydride corresponds to from 2 to 100 times the stoichiometric amount of said protic impurities.

9. A method according to claim 1, wherein said metal hydride is activated by milling under an inert gas atmosphere.

10. A method according to claim 1, wherein the organic liquid electrolyte is stirred with said metal hydride.

11. A method according to claim 1, wherein the organic liquid electrolyte is passed over a fixed bed containing said metal hydride.

12. A method according to claim 1, wherein said insoluble reaction byproducts are separated by at least one of filtration or centrifugation.

13. A method comprising removing water and other protic impurities form an organic liquid electrolyte by contacting an organic liquid electrolyte comprising a solution of at least one lithium electrolyte and at least one aprotic, polar organic solvent with at least one insoluble alkali metal hydride for at least 5 hours and separating insoluble reaction byproducts therefrom to form a purified organic liquid electrolyte having a total content of water and other protic impurities of less than 20 ppm.

14. A method according to claim 13, wherein said alkali metal hydride is LiH or NaH.

15. A method according to claim 14, wherein said alkali metal hydride is LiH.

16. A method according to claim 14, wherein the alkali metal hydride is NaH.

17. A method according to claim 13, wherein the said organic liquid electrolyte contains less than 0.6 mmol/g of protic impurities.

18. A method according to claim 17, wherein the amount of metal hydride corresponds at least to the stoichiometric amount of said protic impurities.

19. A method according to claim 17, wherein the amount of metal hydride corresponds to from 2 to 100 times the stoichiometric amount of said protic impurities.

20. A method according to claim 13, wherein the method is conducted at a temperature is from −20 to 150° C.

21. A method according to claim 20, wherein the temperature is from 0 to 90° C.

22. A method according to claim 13, wherein said metal hydride is activated by milling under an inert gas atmosphere.

23. A method according to claim 13, wherein the organic liquid electrolyte is stirred with said metal hydride.

24. A method according to claim 13, wherein the organic liquid electrolyte is passed over a fixed bed containing said metal hydride.

25. A method according to claim 13, wherein said insoluble reaction byproducts are separated by at least one of filtration or centrifugation.

\* \* \* \* \*